Figure 1:
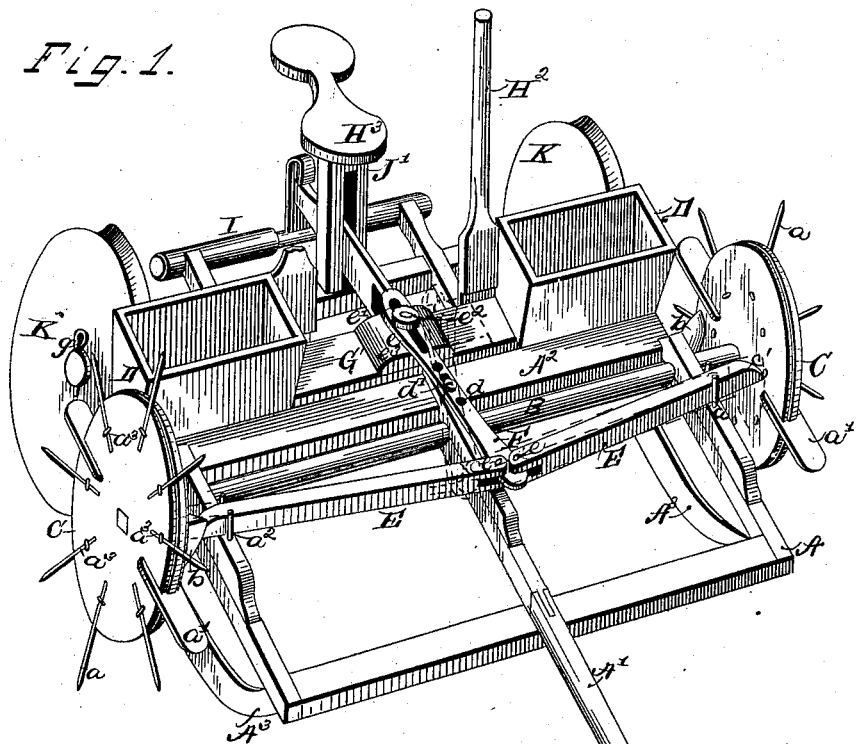

(No Model.) 2 Sheets—Sheet 1.

J. MARCO.
CHECK ROWER AND CORN PLANTER.

No. 365,397. Patented June 28, 1887.

Witnesses.
Fred. Kellott
H. J. England

Inventor
Joseph Marco
By
E. N. Gelstm
Atty.

(No Model.)  J. MARCO.  2 Sheets—Sheet 2.
CHECK ROWER AND CORN PLANTER.
No. 365,397. Patented June 28, 1887.
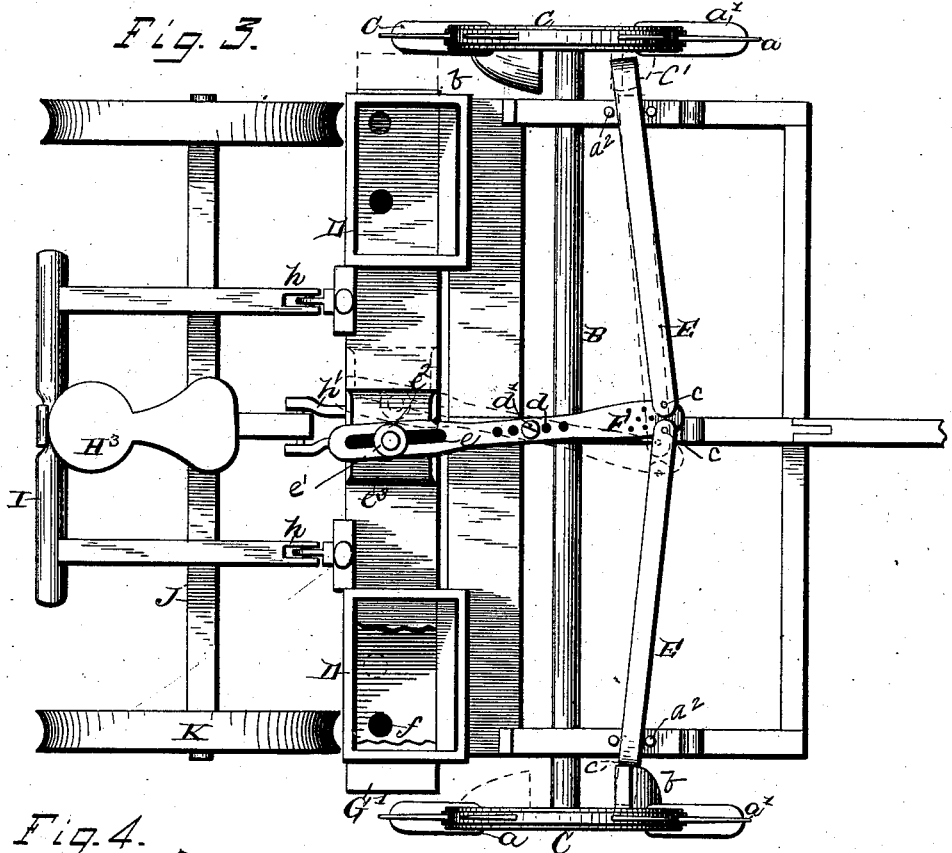
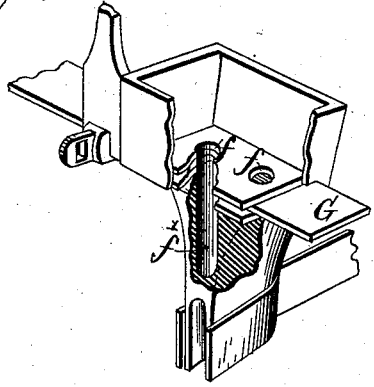
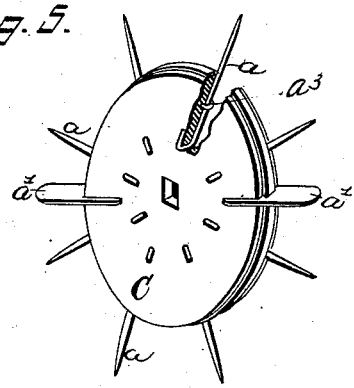
Witnesses.
Fred. Heller
H. J. England.
Inventor.
Joseph Marco
By.
E. N. Gelston
Atty.

UNITED STATES PATENT OFFICE.

JOSEPH MARCO, OF HARLAN, IOWA.

CHECK-ROWER AND CORN-PLANTER.

SPECIFICATION forming part of Letters Patent No. 365,397, dated June 28, 1887.

Application filed March 15, 1887. Serial No. 230,994. (No model.)

*To all whom it may concern:*

Be it known that I, JOSEPH MARCO, a citizen of the United States, residing at Harlan township, in the county of Shelby and State of Iowa, have invented certain new and useful Improvements in Check-Rowers and Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in a combined check-rower and corn-planter.

The object of the present invention is to provide a combined check-rower and corn-planter that will successfully plant the corn without having first scored, furrowed out, or marked the ground to be planted.

The invention consists in two frames mounted on wheels and connected, and in the several details of construction, substantially as shown in the drawings, and hereinafter described and claimed.

Figure 2:
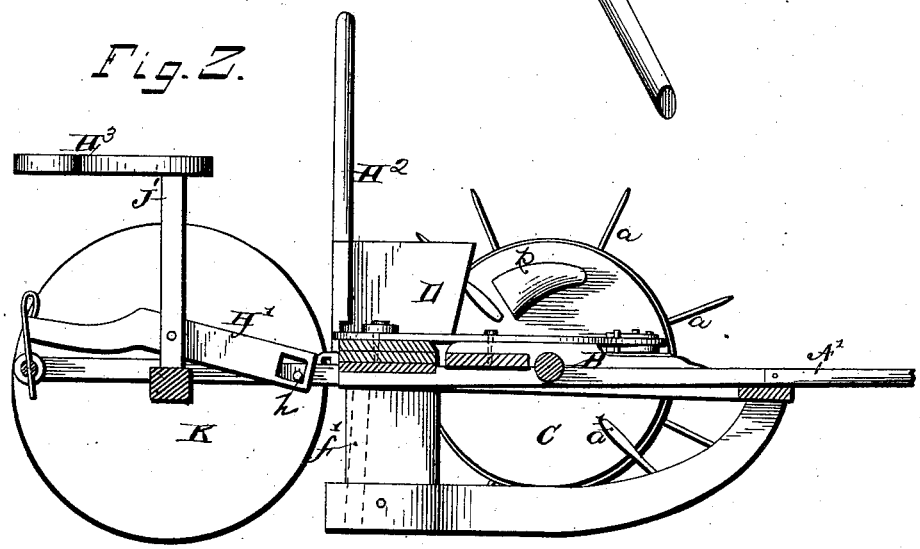

Reference being had to the annexed drawings, making a part of this specification, and to the letters and figures of reference marked thereon, Figure 1 of the drawings is a perspective view of my invention. Fig. 2 is a vertical longitudinal sectional view. Fig. 3 is a top plan view, and Figs. 4 and 5 are detail sectional views.

Similar letters refer to like parts throughout the drawings.

In the accompanying drawings, A represents a frame having a tongue, A', for the attachment of power. About midway across the frame extends an axle, B, which is loosely journaled in the side pieces of frame A, and the outer ends of said axle are provided with wheels C, that have projecting spikes $a$ secured to their outer faces, and flat-blade extension-pieces $a'$ inserted in their periphery, said pieces being used as hill-markers, and the spikes $a$ to penetrate the ground to prevent the wheels C from slipping, said wheels being rigidly secured to the ends of shaft B.

D are seed-boxes provided with bottom perforations, $f$, that register with perforations formed in the sliding board G, which in its alternate sliding movement across frame A opens and closes perforations $f$, as shown in Fig. 3, and hereinafter described.

On the inner faces of wheels C, and a short distance inward from their peripheries, are secured curved cam-blocks $b$, their outer faces being inclined, the purpose of this construction being to abut against the curved ends of the connecting-bars E. Said bars rest upon the sides of frame A and move between upright pins $a^2$. The outer ends of bars E have curved ends $c'$, and the inner ends are slotted to admit one end of the pivoted lever F, and the bars E are loosely held to said lever by pivot-pins $c$. Lever F is provided with a series of perforations, $d$, formed near its center, either one of which is adapted to loosely fit a pivot-pin, $d'$, projecting from the wide cross-bar $A^2$, and changing the position of lever F lengthwise, so that the inner perforation, $d$, surrounds $d'$. The outer arm of lever F will be lengthened and the inner end shortened. The inner end of lever F is slotted at $e$, to receive a projecting pin, $e'$, that has a retaining-washer, $e^2$, secured to its outer end. Its inner end is fastened to a curved projecting block, $e^3$, that is secured by its lower face to the upper face of the sliding seed-board G, about midway between the seed-boxes D, as shown in Fig. 1 of Sheet 1 and in Fig. 3 of Sheet 2. By this construction, when the wheels C are revolved, the curved blocks $b$ come in contact with the curved ends $c'$ of bars E, whereby they are alternately moved endwise, thus moving the lever F against the pivot-pin $d$, causing the inner end of said lever to move the seed-board G the required distance to alternately open and close the openings $f$, whereby the seed is dropped at intervals, as desired, by passing out through the tubes $f'$. Spikes or spokes are inserted in sockets of wheels C, whereby they may be extended outward to enlarge the wheels or drawn inward to contract the diameter of the same, or they may be bent inward on their inner ends and held by staples $a^3$. A standard, $H^2$, is secured to the rear of frame A, within easy reach of the operator, whereby, by grasping the standard at or near the top and pulling backward, the frame will be tilted backward and the wheels C lifted off from the ground, and transportation made easy from place to place. Frame I is secured to an axle, J, which is supported at its ends by wheels K, which loosely revolve on said axle, and are held in place by pins $g$. A driver's seat, H³, surmounts axle J on a standard, J', and the frame I is connected to the rear of frame A by pivot-pins $h$, whereby the driver is enabled to tilt the frame A backward at will. Power being applied at A', the machine is moved forward. Wheels C, revolving, stamp the hills by the flat projections $a'$. The inclined blocks $b$, alternately striking against the curved ends $e'$ of bars E, move them lengthwise, which moves the lever F against the pivot-pin $d'$, which causes the inner end of lever F to move the sliding seed-board G the desired distance to open and close the seed-openings in the bottom of seed-boxes D, whereby the seed falls to the ground, and is covered by the wheels K, which travel in line with the tubes $f'$.

Having described my invention, what I claim, and desire to secure by Letters Patent, is—

1. The combination, in a check-rower and corn-planter, of a frame, a revolving axle with wheels rigidly secured thereto, metal projections extending from the periphery of said wheels, inclined blocks secured to the inner face of said wheels, and a pivoted lever moving horizontally on said frame, one end secured to a sliding seed-board, its opposite end pivoted to projecting arms adapted at their outer ends to contact with said inclined blocks, all substantially as and for the purpose set forth.

2. In a check-rower and corn-planter, the frame A, the arms E, the lever F, the seed-boxes D, and the sliding board G, in combination with the axle B, the wheels C, having projections $a$ and $a'$, and the inclined blocks $b$, arranged and operated substantially as shown and described.

3. A check-rower and corn-planter consisting of a frame, A, having a revolving shaft, B, rigidly secured to wheels C, having metal projections $a$ and $a'$ and inclined blocks $b$, the arms E, lever F, pivot-pin $d'$, the block $e$, pivot-pin $e^2$, the seed-boxes D, the sliding seed-board G, and the standard H², in combination with the frame I, axle J, wheels K, and the seat H³, all connected and operated substantially as shown and described.

In testimony whereof I affix my signature in presence of two witnesses.

JOSEPH MARCO.

Witnesses:
ELLMORE MARCOE,
BENJ. F. BLAKE.